(12) United States Patent
Gannamaneni et al.

(10) Patent No.: US 12,316,157 B2
(45) Date of Patent: May 27, 2025

(54) VEHICLE-TO-VEHICLE CHARGING

(71) Applicant: Volvo Car Corporation, Gothenburg (SE)

(72) Inventors: Narendar Rao Gannamaneni, Gothenburg (SE); Lars Johan Henrik Sjöstedt, Gothenburg (SE); Arsam Golriz, Gothenburg (SE); Niklas Smith, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 595 days.

(21) Appl. No.: 17/669,960

(22) Filed: Feb. 11, 2022

(65) Prior Publication Data

US 2022/0285971 A1 Sep. 8, 2022

Related U.S. Application Data

(60) Provisional application No. 63/157,197, filed on Mar. 5, 2021.

(51) Int. Cl.
*H02J 7/34* (2006.01)
*B60L 53/18* (2019.01)
(Continued)

(52) U.S. Cl.
CPC .............. *H02J 7/342* (2020.01); *B60L 53/18* (2019.02); *B60L 53/24* (2019.02); *B60L 53/305* (2019.02);
(Continued)

(58) Field of Classification Search
CPC ........ H02J 7/342; H02J 2207/20; B60L 53/57
(Continued)

(56) References Cited

U.S. PATENT DOCUMENTS 11,165,275 B2 * 11/2021 Lee .................... B60L 53/53
11,235,678 B1 * 2/2022 Hao .................... H02M 1/32
(Continued)

FOREIGN PATENT DOCUMENTS

EP  3915824 A1  12/2021
EP  3915826 A1  12/2021
(Continued)

OTHER PUBLICATIONS

U.S. Appl. No. 63/155,032, filed Mar. 1, 2021, 40 pages.
(Continued)

*Primary Examiner* — Jack Chiang
*Assistant Examiner* — Suchin Parihar
(74) *Attorney, Agent, or Firm* — Amin, Turocy & Watson, LLP

(57) ABSTRACT

A method can comprise determining, by a first controller comprising a processor, of a first vehicle, a first voltage rating of a first battery of the first vehicle and a state of charge of the first battery. In various embodiments, the method can further comprise determining, by the first controller, based on an output of a second controller of a second vehicle, a second voltage rating of a second battery of the second vehicle and a state of charge of the second battery. In further embodiments, the method can further comprise in response to a determination, by the first controller, that the first voltage rating matches the second voltage rating, transferring, by the first controller, power from the first battery to the second battery, wherein the state of charge of the first battery is greater than the state of charge of the second battery.

20 Claims, 7 Drawing Sheets

(51) Int. Cl.
- *B60L 53/24* (2019.01)
- *B60L 53/30* (2019.01)
- *B60L 53/57* (2019.01)
- *B60L 53/62* (2019.01)
- *B60L 53/66* (2019.01)

(52) U.S. Cl.
CPC .............. *B60L 53/57* (2019.02); *B60L 53/62* (2019.02); *B60L 53/66* (2019.02); *H02J 2207/20* (2020.01)

(58) Field of Classification Search
USPC ........................................................ 320/109
See application file for complete search history.

(56) References Cited

U.S. PATENT DOCUMENTS

| | | | | |
|---|---|---|---|---|
| 2012/0303213 A1* | 11/2012 | Prosser | ................. | B60L 53/305 |
| | | | | 320/107 |
| 2013/0020993 A1* | 1/2013 | Taddeo | ................. | B60L 53/65 |
| | | | | 320/109 |
| 2018/0251121 A1* | 9/2018 | Jorgensen | ............. | B60W 20/20 |
| 2020/0086747 A1* | 3/2020 | Bhat | ........................ | B60L 53/67 |
| 2020/0373781 A1 | 11/2020 | Lee et al. | | |
| 2021/0044135 A1* | 2/2021 | Lee | ........................ | H02J 7/1492 |
| 2021/0061118 A1 | 3/2021 | Lee et al. | | |
| 2022/0255417 A1* | 8/2022 | Zhu | ........................ | H02M 7/483 |

FOREIGN PATENT DOCUMENTS

| | | |
|---|---|---|
| JP | 2012-196105 A | 10/2012 |
| WO | 2019/215128 A1 | 11/2019 |

OTHER PUBLICATIONS

U.S. Appl. No. 17/587,681, filed Jan. 28, 2022, 34 pages.
Extended European Search Report received for E.P Patent Application Serial No. 22160008.3 dated May 19, 2022, 7 pages.
Communication Pursuant to Rule 69 EPC received for EP Patent Application Serial No. 22160008.3 dated Sep. 12, 2022, 2 pages.
Communication Pursuant to Article 94(3) EPC received for EP Patent Application Serial No. 22160008.3 dated Sep. 25, 2023, 8 pages.

* cited by examiner

VEHICLE-TO-VEHICLE CHARGING

CROSS-REFERENCE TO RELATED APPLICATION

This application claims priority to U.S. Provisional Patent Application No. 63/157,197, filed on Mar. 5, 2021, and entitled "VEHICLE-TO-VEHICLE HIGH-POWER CHARGING," the entirety of which application is hereby incorporated by reference herein.

TECHNICAL FIELD

The disclosed subject matter relates to electric vehicles, and more particularly, to vehicle to vehicle charging using an inverter of an electric vehicle.

BACKGROUND

Electric vehicles (EVs) are becoming increasingly prevalent worldwide, and are poised to become one of the most common modes of transportation. Similar to an internal combustion engine vehicle running out of gasoline or diesel fuel, there exists a possibility that an EV can become stranded in a remote location with a drained battery (e.g., a low state of charge). This can be frustrating and even dangerous for a user of the EV, depending on weather conditions, location, or other factors. Further, recharging EVs can be complicated due to the variety of battery and charging systems utilized in EVs.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. As described, there exists a need for a vehicle-to-vehicle power transfer system, and various embodiments are described herein to this end and/or other ends.

According to an embodiment, a system can comprise a first vehicle comprising a first battery, a first controller, an inverter, and an electric motor; and a second vehicle comprising a second battery and a second controller, wherein the electric motor and the inverter convert an output voltage of the first battery to a voltage rating of the second battery, and wherein the first vehicle charges the second battery at the output voltage.

According to another embodiment, a vehicle-to-vehicle power transfer system, can comprise a first vehicle comprising a first battery, a first controller, an inverter, and an electric motor; and a second vehicle comprising a second battery and a second controller, wherein the electric motor and the inverter convert an output voltage of the second battery to a voltage rating of the first battery, and wherein the second vehicle charges the first battery at the output voltage.

According to an additional embodiment, a method can comprise determining, by a first controller comprising a processor, of a first vehicle, a first voltage rating of a first battery of the first vehicle and a state of charge of the first battery; determining, by the first controller, based on an output of a second controller of a second vehicle, a second voltage rating of a second battery of the second vehicle and a state of charge of the second battery; and in response to a determination, by the first controller, that the first voltage rating matches the second voltage rating, transferring, by the first controller, power from the first battery to the second battery, wherein the state of charge of the first battery is greater than the state of charge of the second battery.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It will be understood that when an element is referred to as being "coupled" to another element, it can describe one or more different types of coupling including, but not limited to, chemical coupling, communicative coupling, capacitive coupling, electrical coupling, electromagnetic coupling, inductive coupling, operative coupling, optical coupling, physical coupling, thermal coupling, and/or another type of coupling. As referenced herein, an "entity" can comprise a human, a client, a user, a computing device, a software application, an agent, a machine learning model, an artificial intelligence, and/or another entity. It should be appreciated that such an entity can facilitate implementation of the subject disclosure in accordance with one or more embodiments the described herein.

Figure 1:
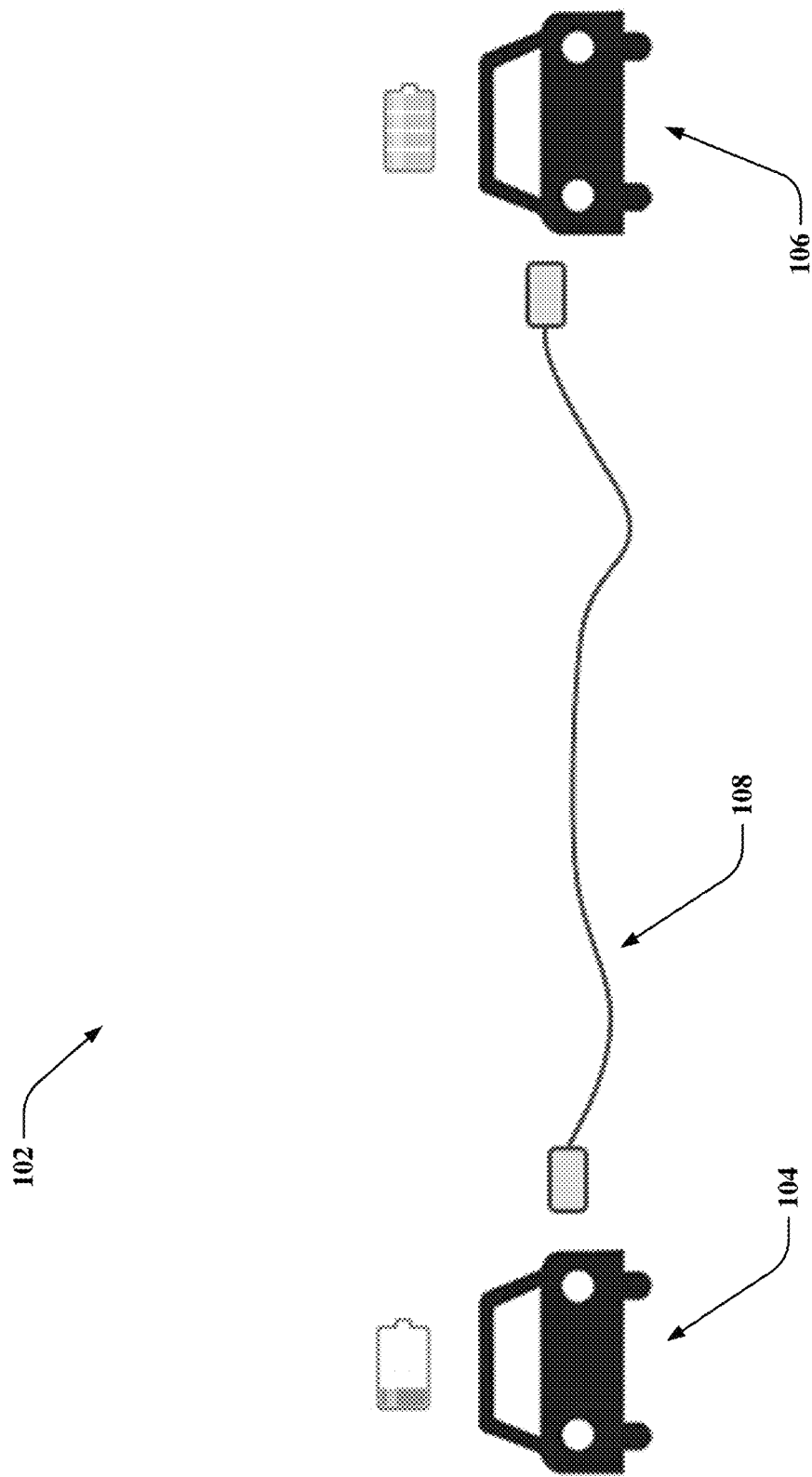
FIG. 1 illustrates a block diagram of an example, non-limiting vehicle-to-vehicle power transfer system in accordance with one or more embodiments described herein.

Turning now to FIG. 1, there is illustrated a block diagram of an example, non-limiting vehicle-to-vehicle power transfer system 102 in accordance with one or more embodiments described herein. In vehicle-to-vehicle power transfer system 102, a vehicle 104 can be electrically coupled to a vehicle 106 (e.g., using a cable 108). The cable 108 can transfer power and/or other information (e.g., via one or more positive cables, negative cables, communication cables, or other suitable cables), such as battery or vehicle information (e.g., voltage ratings of batteries, state of charge (SOC)). In further embodiments, such battery or vehicle information can be wirelessly transferred between the vehicle 104 and the vehicle 106 (e.g., via respective communication components). In FIG. 1, vehicle 104 can comprise a low SOC, and vehicle 106 can comprise a high SOC (e.g., vehicle 104 comprises a SOC lower than that of vehicle 106), though the inverse can also occur (e.g., vehicle 104 comprises a SOC higher than that of vehicle 106).

Figure 2:
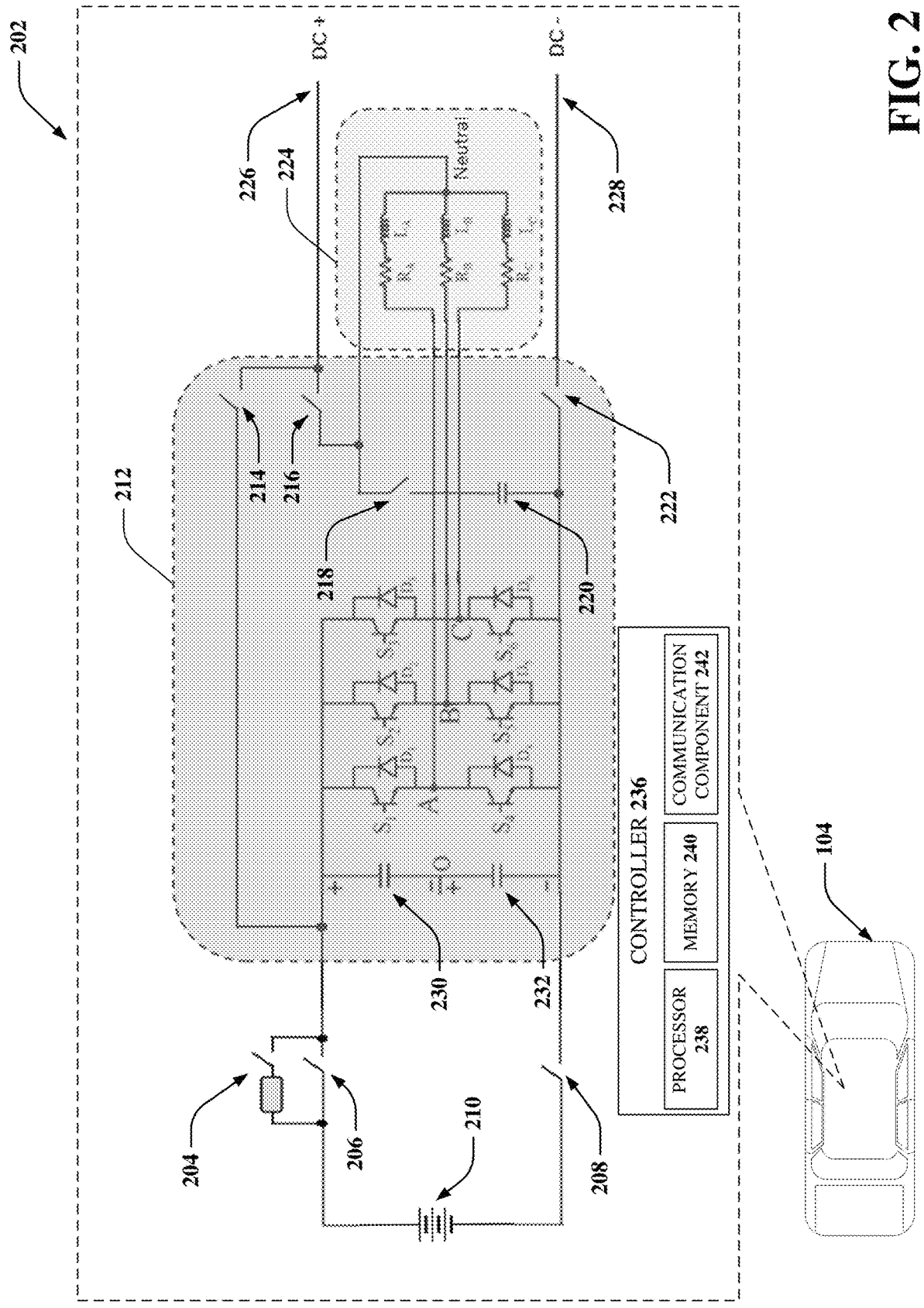
FIG. 2 illustrates a block diagram of an example, non-limiting vehicle in accordance with one or more embodiments described herein.

FIG. 2 illustrates an example, a non-limiting vehicle 104 (e.g., comprising a charging system 202) in accordance with one or more embodiments is described herein. In various embodiments, vehicle 104 can comprise switch 204, switch 206, switch 208, switch 222, switch 216, switch 214, switch 218, capacitor 220, capacitor 230, capacitor 232, direct current (DC) positive connection 226, DC negative connection 228, battery 210, inverter 212, electric motor 224 (e.g., a single phase or a three phase electric motor), and/or controller 236.

In various embodiments, one or more of the switch 204, switch 206, switch 208, switch 222, switch 216, switch 214, switch 218, capacitor 220, capacitor 230, capacitor 232, DC positive connection 226, DC negative connection 228, battery 210, inverter 212, electric motor 224, and/or controller 236 can be communicatively or operably coupled to one another to perform one or more functions of the vehicle 104 and/or charging system 202.

According to an embodiment, the electric motor 224 (e.g., an e-Machine or an alternating current (AC) electric motor) can comprise three-phase stator windings, and can be connected to a common point (e.g., neutral terminal or circuit) and an inverter 212 (e.g., a traction inverter), which can generate three phase power as required by the electric motor 224. According to an embodiment, the inverter 212 can comprise at least six switches: insulated-gate bipolar transistors (IGBTs) or Silicon Carbide (SiC) metal-oxide-semiconductor field-effect transistors (MOSFETs), or other suitable switches, contactors, or relays. The switches (e.g., semiconductor switches) (e.g., $S_1$, $S_2$, $S_3$, $S_4$, $S_5$, and $S_6$) can comprise built-in body diodes (e.g., $D_1$, $D_2$, $D_3$, $D_4$, $D_5$, and $D_6$). Two capacitors (e.g., capacitors 230 and 232) can be located on the input side of inverter 212, though it is noted that the inverter 212 can comprise other quantities or combinations of capacitors. In various embodiments, $L_A$, $L_B$, and $L_C$ can comprise the stator inductances of the electric motor 124, and $R_A$, $R_B$, and $R_C$ can comprise winding resistances. In various embodiments, the inverter 212 can comprise one or more switches and one or more capacitors, and the electric motor 224 can be accessed through a separate busbar. It is noted that, in one or more embodiments, the switches 222, 216, 214, and 218, and capacitor 220 can be located inside the inverter 212. In some embodiments, the switch 218 can be circuit driven and responsive to an input of a defined voltage. In further embodiments, the switch 218 can be controlled by a controller 236.

It is noted that by implementing switch 218, capacitor 220 need not comprise a voltage greater than battery 210, thus reducing the size and weight of the capacitor 220. Thus, various embodiments, the capacitor 220 can comprise a 400 volt capacitor 220. It is noted that in various embodiments the capacitor 220 can be connected in parallel to the electric motor 224 and the inverter 212 (e.g., by opening or closing one or more of switches 204, 206, 208, 222, 216, 214, and/or 218).

According to an embodiment, the controller 236 can comprise a processor 238, memory 240, and/or communication component 242. In various embodiments, the controller 236 (e.g., a microcontroller) can be communicatively connected to other components of the vehicle 104 or charging system 202 and/or another controller wirelessly or via a bus (e.g., a Controller Area Network (CAN bus) or Communication Protocol (PLCBUS)), for example, of cable 108. It is noted that the communication component 242 can comprise the hardware required to implement a variety of communication protocols (e.g., infrared ("IR"), shortwave transmission, near-field communication ("NFC"), Bluetooth, Wi-Fi, long-term evolution ("LTE"), 3G, 4G, 5G, 6G, global system for mobile communications ("GSM"), code-division multiple access ("CDMA"), satellite, visual cues, radio waves, etc.)

Figure 3:
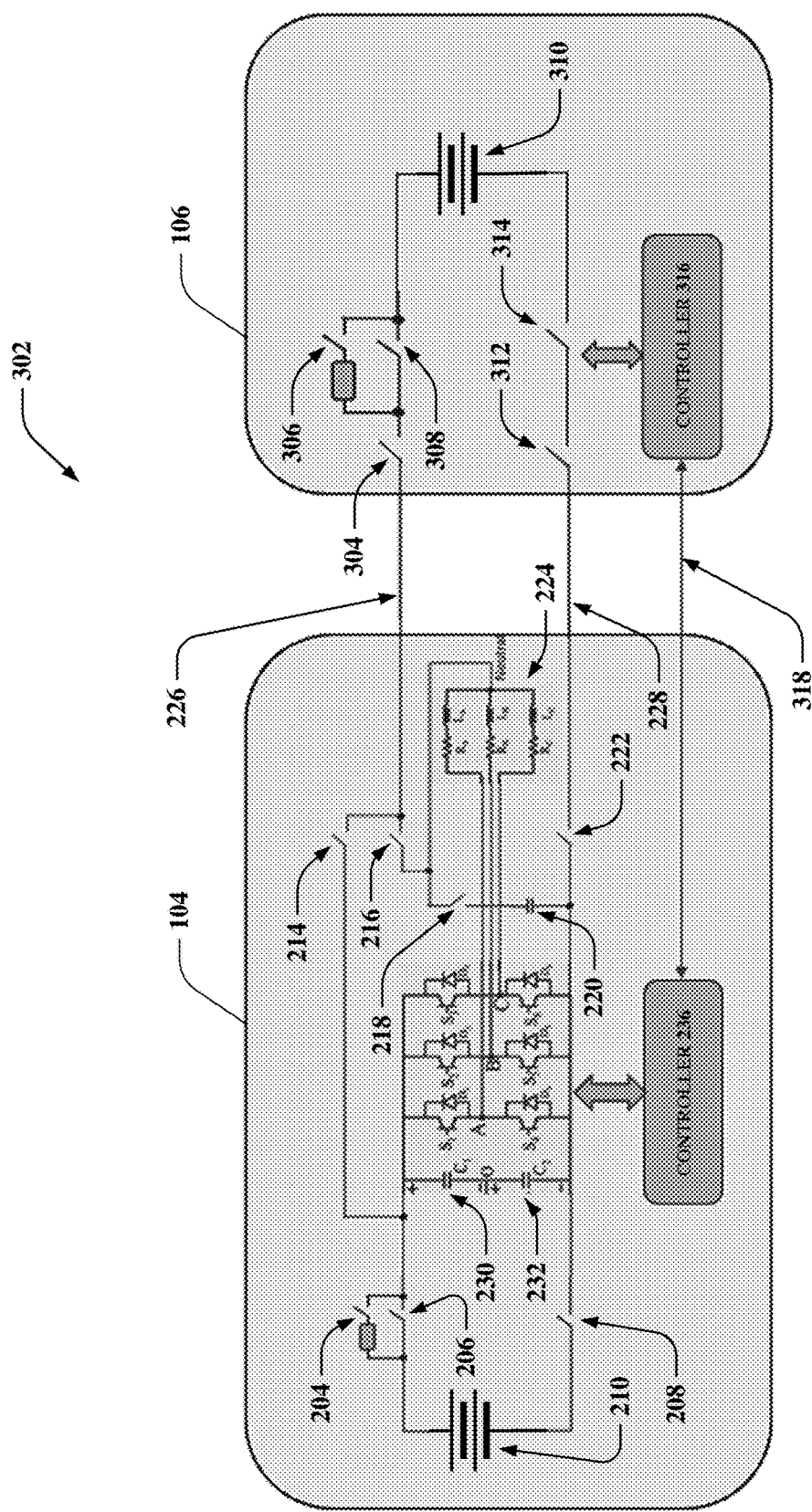
FIG. 3 illustrates a block diagram of an example, non-limiting vehicle-to-vehicle power transfer system in accordance with one or more embodiments described herein.

With reference to FIG. 3, there is illustrated block diagram of an example, non-limiting vehicle-to-vehicle power transfer system 302 in accordance with one or more embodiments described herein. In vehicle-to-vehicle power transfer system 302, vehicle 104 or vehicle 106 can supply power to the other, depending on a respective SOC of the vehicle 104 and/or vehicle 106. For example, power can be transferred from a vehicle comprising a high SOC to a vehicle comprising a low SOC, though the inverse can additionally or alternatively occur in which power can be transferred from a vehicle comprising a low SOC to a vehicle comprising a high SOC. As previously discussed, vehicle 104 can comprise switch 204, switch 206, switch 208, switch 222, switch 216, switch 214, switch 218, capacitor 220, capacitor 230, capacitor 232, battery 210, inverter 212, and/or electric motor 224. Repetitive description of like elements and/or processes employed in respective embodiments is omitted for sake of brevity.

According to an embodiment, vehicle 106 can comprise switch 304, switch 306, switch 308, battery 310, switch 312, switch 314, and/or controller 316. According to an embodiment, switch 306 can be similar to switch 204, switch 308 can be similar to switch 206, and switch 304, switch 312, and/or switch 314 can be similar to one or more of switch 208, switch 214, switch 216, switch 218, switch 222, or another switch herein.

In various embodiments, one or more of the switch 304, switch 306, switch 308, battery 310, switch 312, switch 314, and/or controller 316 can be communicatively or operably coupled to one another to perform one or more functions of the vehicle 106.

According to an embodiment, controller 316 can be similar to controller 236, and can thus comprise a processor 238, memory 240, and/or communication component 242. In various embodiments, battery 310 can comprise a voltage lower than that of battery 210. For example, battery 210 can comprise an 800 volt battery, and battery 310 can comprise a 400 volt battery, though other suitable respective voltages for battery 210 or battery 310 can be utilized.

According to an embodiment, the vehicle 104 can be connected to the vehicle 106 via DC positive connection 226, DC negative connection 228, and/or communication connection 318. It is noted that the cable 108, as previously discussed, can comprise the DC positive connection 226, DC negative connection 228, and/or communication connection 318. In various embodiments, communication connection 318 can comprise a wired connection. In further embodiments, communication connection 318 can comprise a wireless connection.

In various embodiments, vehicle 104 (e.g., via the inverter 212 and electric motor 224) can facilitate bidirectional DC-DC power conversion. In this regard, the battery 210 (e.g., an 800 volt battery) can be charged from any 400 volt charging station or vehicle by utilizing a boost function via the inverter 212 and electric motor 224. Further, the battery 210 can be discharged to transfer power to any vehicle comprising a 400 volt battery (or a different battery voltage lower than the voltage of the battery 210) by utilizing a buck (e.g., step down) function. Additionally, the battery 210 can be discharged to transfer power to any vehicle comprising a battery with a voltage that is the same or within a defined threshold of the voltage of the battery 210. According to an embodiment, the inverter 212 can operate in a buck mode comprising step down DC to DC of a voltage of the battery 210 to the output voltage of the battery 210.

According to an embodiment, vehicle 104 can comprise a high SOC, and vehicle 106 can comprise a low SOC. In this regard, battery 210 can comprise a SOC higher than that of battery 310. Communication between the vehicle 104 and vehicle 106 can be established (e.g., between controller 236 and controller 316 via communication connection 318) in order determine and/or compare SOCs, voltage ratings, or other suitable information of respective batteries of the vehicle 104 and vehicle 106. Upon a determination (e.g., by the controller 236 or controller 316) that the vehicle 104 comprises a high SOC and the vehicle 106 comprises a low SOC (e.g., the vehicle 104 comprises an SOC higher than that of the vehicle 106), the vehicle 104 can transfer power from battery 210 to battery 310. In this regard, the inverter 212 and electric motor 224 can convert a voltage of battery 210 to an output voltage that corresponds to a voltage rating of a battery of another vehicle (e.g., battery 310 of vehicle 106). According to an example, if battery 310 is rated for 400 volt nominal voltage (or another voltage lower than that of battery 210), the inverter 212 and electric motor 224 of the vehicle 104 can operate in a buck mode, so that the battery 310 can safely obtain a charge from the battery 210. In this regard, the controller 236 can close switch 206, switch 208, switch 222, switch 216, and switch 218 and can control the semiconductor switches $S_1$, $S_2$, $S_3$, $S_4$, $S_5$, and/or $S_6$ in order to regulate current flowing into the battery 310 (e.g., in buck mode). The controller 316 (or controller 236) can close switch 308, switch 314, switch 304, and switch 312. Further, the controller 316 can transmit voltage and current limits of the battery 310 to the controller 236 the communication connection 318. In further embodiments, such communication can be executed wirelessly using one or more respective communication components (e.g., communication component 242).

According to an embodiment, the controller 236 can control the semiconductor switches $S_1$, $S_2$, $S_3$, $S_4$, $S_5$, and/or $S_6$ in a buck mode. Each leg of the inverter 112 can comprise two of the semiconductor switches along with respective built-in body diodes. In various embodiments, a first leg can comprise $S_1$ with built-in diode $D_1$, and $S_4$ with built-in diode $D_4$. Similarly a second leg can comprise $S_2$ with built-in diode $D_2$, and $S_5$ with built-in diode $D_5$, and a third leg can comprise $S_3$ with built-in diode $D_3$, and $S_6$ with built-in diode $D_6$. In the buck mode, each leg of the inverter 212 can operate as step down converter. In this regard, the inverter 112 can comprise three step down converters that can be connected to each phase of the electric motor 224 operating with 120 degree phase shift between them. According to an embodiment, in the first leg, when $S_1$ is turned ON, current from the battery 210 of vehicle 104 can flow into the battery 310 of vehicle 106, while the capacitor 220 concurrently charges. Next, $S_1$ can turn OFF, and $S_4$ can turn ON. The foregoing can comprise a freewheeling phase or period, in which the capacitor 220 supplies current to the vehicle 106. The turn ON period of $S_1$ can be determined (e.g., by the controller 236) based on a voltage ratio between battery 310 voltage and battery 210 voltage. According to an example, if the ratio is higher, the turn ON time of $S_1$ can be longer compared to $S_4$. According to an embodiment, the second leg of semiconductor switches can operate with the same pulse pattern as the first leg, except the phase shift between $S_2$ in the second leg and $S_1$ in the first leg is approximately 120 degrees. Similarly, third leg of semiconductor switches can operate with the same pulse pattern as the first leg, except the phase shift between $S_3$ in the third leg and $S_1$ in the first leg is approximately 240 degrees. Between $S_3$ in the third leg and $S_2$ in the second leg, there can be a phase shift of approximately 120 degrees. The same pattern with phase shifts can be applicable for the lower semiconductor switches (e.g., $S_4$, $S_5$, and $S_6$).

According to another embodiment, vehicle 104 can comprise a low SOC, and vehicle 106 can comprise a high SOC. In this regard, battery 210 can comprise a SOC lower than that of battery 310. Communication between the vehicle 104 and vehicle 106 can be established (e.g., between controller 236 and controller 316 via communication connection 318) in order determine and/or compare SOCs, voltage ratings, or other suitable information of respective batteries of the vehicle 104 and vehicle 106. Upon a determination that the vehicle 104 comprises a low SOC and the vehicle 106 comprises a high SOC (e.g., the vehicle 104 comprises an SOC lower than that of the vehicle 106), the vehicle 104 can transfer power from battery 310 to battery 210. In this regard, the inverter 212 and electric motor 224 can convert an output voltage of the battery 310 of vehicle 106 a voltage rating of the battery 210. In order to charge the battery 210 with the battery 310, the inverter 212 and electric motor 224 of the vehicle 104 can operate in a boost mode. In this regard, controller 236 can close the switch 206, switch 208, switch 222, switch 216, and switch 218, and can control the switches $S_1$, $S_2$, $S_3$, $S_4$, $S_5$, and/or $S_6$ in order to regulate current flowing into the battery 210 (e.g., in boost mode). The controller 316 can close switch 308, switch 314, switch 304, and switch 312. Further, the controller 316 can transmit voltage and current limits of the battery 310 to the controller 236 the communication connection 318. In further embodiments, such communication can be executed wirelessly using one or more respective communication components (e.g., communication component 242).

According to an embodiment, the controller 236 can control the semiconductor switches $S_1$, $S_2$, $S_3$, $S_4$, $S_5$, and/or $S_6$ in a boost mode. In the boost mode, each leg of the inverter 112 can operate as step up converter. In this regard, the inverter 112 can comprise three step up converters that can be connected to each phase of the electric motor 224 operating with 120 degree phase shift between them. According to an embodiment, in the first leg, when $S_4$ is turned ON, current from the battery 310 of the vehicle 106 can flow into the winding inductance (La) of the electric motor 224, which can store energy during this period. The battery 210 of vehicle 104 can concurrently charge from capacitor 230 and/or capacitor 232. Next, $S_4$ can turn OFF, and $S_4$ can turn ON. The stored energy in inductor La can supply current to the vehicle 104, while the capacitor 230 and/or capacitor 232 can concurrently charge. The turn ON period of $S_4$ can be determined (e.g., by the controller 236) based on a voltage ratio between battery 210 voltage and battery 310 voltage. According to an example, if the ratio is higher, the turn ON time of $S_4$ can be lower as compared to $S_1$. According to an embodiment, the second leg of semiconductor switches can operate with the same pulse pattern as the first leg, except the phase shift between $S_2$ in the second leg and $S_1$ in the first leg is approximately 120 degrees. Similarly, third leg semiconductor switches can operate with the same pulse pattern as the first leg, except the phase shift between $S_3$ in the third leg and $S_1$ in the first leg is approximately 240 degrees. Between $S_3$ in the third leg and $S_2$ in the second leg, there can be a phase shift of approximately 120 degrees. The same pattern with phase shifts can be applicable for the lower semiconductor switches (e.g., $S_4$, $S_5$, and $S_6$).

Figure 4:
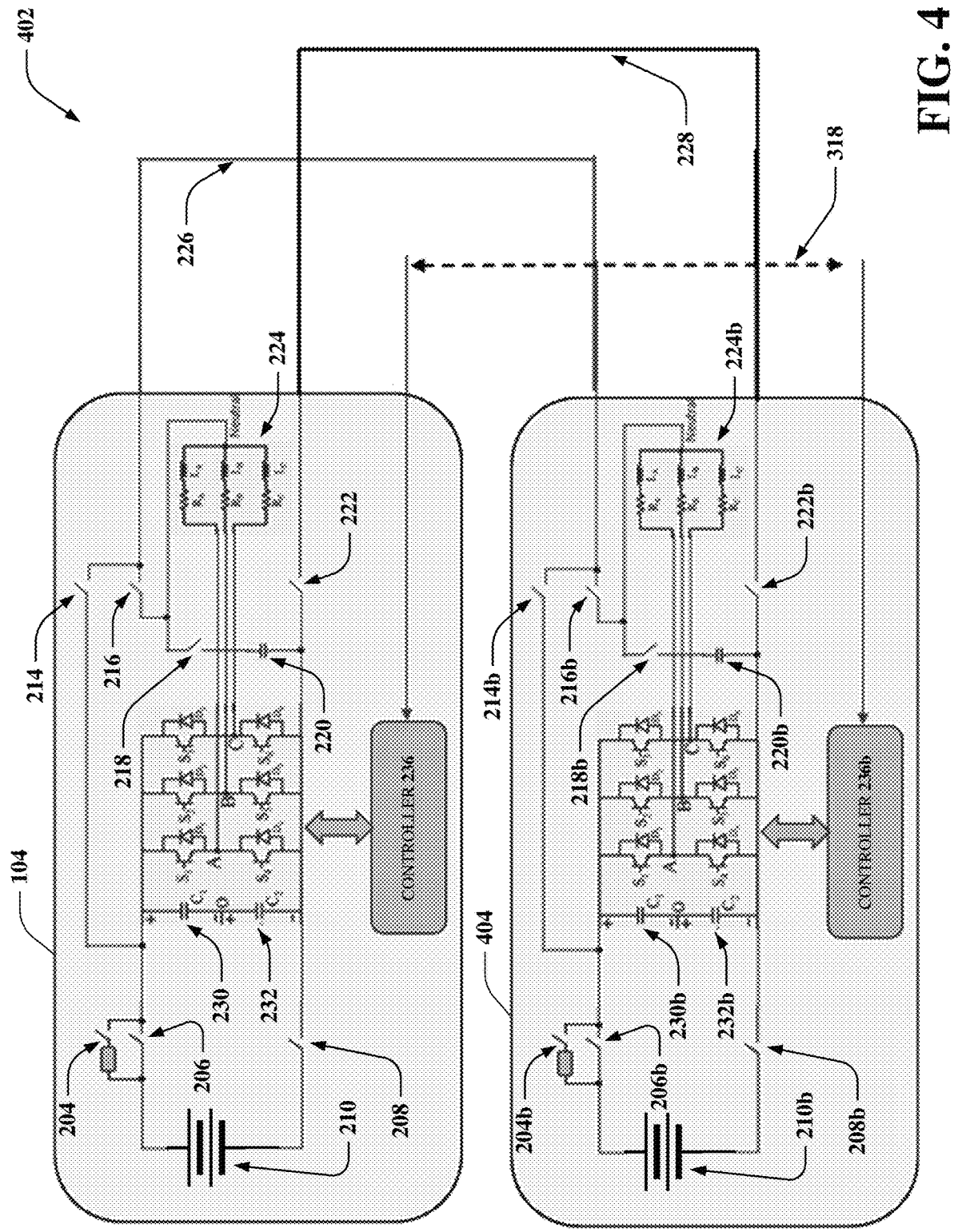
FIG. 4 illustrates a block diagram of an example, non-limiting vehicle-to-vehicle power transfer system in accordance with one or more embodiments described herein.

FIG. 4 illustrates a block diagram of an example, non-limiting vehicle-to-vehicle power transfer system 402 in accordance with one or more embodiments described herein. As previously discussed, vehicle 104 can comprise switch 204, switch 206, switch 208, switch 222, switch 216, switch 214, switch 218, capacitor 220, capacitor 230, capacitor 232, battery 210, inverter 212, electric motor 224, and/or controller 236. Repetitive description of like elements and/or processes employed in respective embodiments is omitted for sake of brevity. Vehicle 404 can similarly comprise switch 204b, switch 206b, switch 208b, switch 222b, switch 216b, switch 214b, switch 218b, capacitor 220b, capacitor 230b, capacitor 232b, battery 210b, inverter 212b, electric motor 224b, and/or controller 236b.

In various embodiments, one or more of the switch 204b, switch 206b, switch 208b, switch 222b, switch 216b, switch 214b, switch 218b, capacitor 220b, capacitor 230b, capacitor 232b, DC positive connection 226b, DC negative connection 228b, battery 210b, inverter 212b, electric motor 224b, and/or controller 236b can be communicatively or operably coupled to one another to perform one or more functions of the vehicle 104 and/or charging system 202.

According to an embodiment, vehicle 104 and vehicle 404 can comprise batteries of the same or similar voltages (e.g., 800 volts or another suitable voltage). In vehicle-to-vehicle power transfer system 402, vehicle 104 or vehicle 404 can supply power to the other, depending on SOCs of respective batteries of the vehicle 104 and/or vehicle 404.

According to an embodiment, vehicle 104 can comprise a high SOC and vehicle 404 can comprise a low SOC. In this regard, battery 210 can comprise a SOC higher than that of battery 210b. Communication between the vehicle 104 and vehicle 106 can be established (e.g., between controller 236 and controller 236b via communication connection 318) in order determine SOCs and/or voltage ratings of respective batteries of the vehicle 104 and vehicle 404. According to an embodiment, upon a determination (e.g., by the controller 236 or controller 236b) that the battery 210 of vehicle 104 comprises a high SOC and the battery 210b of vehicle 404 comprises a low SOC (e.g., the vehicle 104 comprises an SOC higher than that of the vehicle 404) and/or that the battery 210 and battery 210b comprise the same or similar voltage ratings (e.g., within a defined threshold voltage difference), the vehicle 104 can transfer power from battery 210 to battery 210b of the vehicle 404. In an embodiment, the controller 236 can close the switch 206, switch 208, switch 222, switch 216, and switch 218, which can enable power flow through the inverter 212 and electric motor 224 (e.g., operating in buck mode by controlling respective switches $S_1$, $S_2$, $S_3$, $S_4$, $S_5$, and/or $S_6$ as discussed above). Further, the vehicle 404 can close the switch 206b, switch 208b, switch 222b, and switch 214b in order to charge the battery 210b of the vehicle 404 directly from the regulated voltage of the battery 210 of the vehicle 104. Because at low SOC, the battery 210b of the vehicle 404 can comprise a reduced voltage, and the battery 210 of the vehicle 104 can comprise a higher voltage (e.g., than the battery 210b), a buck mode operation can be implemented inside the vehicle 104 (e.g., via inverter 212 and electric motor 224).

According to an example, if the battery 210 of the vehicle 104 (e.g., high SOC) comprises a reduced nominal voltage (e.g., apx. 600 volts to 700 volts), and if the battery 210b of the vehicle 404 (e.g., low SOC) comprises a battery with an increased nominal voltage (e.g., apx. 800 volts to 900 volts), the vehicle 104 can close the switch 206, switch 208, switch 222, and switch 214 in order to bypass the power to the vehicle 404. Next, the vehicle 404 can close the switch 206b, switch 208b, switch 222b, switch 216b, and switch 218b in order to operate its the inverter and electric motor 224b in a boost mode. In this regard, buck operation and boost operation in respective vehicles can utilized when both vehicles comprise system architectures that can support DC-DC power conversion through respective inverters (e.g., traction inverters) and electric motors (e.g., electric machines). Additionally, the foregoing can be facilitated if battery 210 and battery 210b comprises 400 volt batteries or batteries of other suitable voltages. In this regard, both the buck mode of operation and boost mode of operation are operable to transfer the power between the two vehicles (e.g., vehicle 104 and vehicle 404) through respective inverters and electric motors (e.g., operating as DC-DC converters).

Systems herein can comprise a memory which can store one or more computer/machine readable and/or executable components and/or instructions that, when executed by a processor (e.g., a classical processor, a quantum processor, etc.), can facilitate performance of operations defined by the executable component(s) and/or instruction(s). The memory can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures.

Systems herein can comprise a processor which can comprise one or more types of processors and/or electronic circuitry (e.g., a classical processor, graphics processor, a quantum processor, etc.) that can implement one or more computer and/or machine readable, writable, and/or executable components and/or instructions that can be stored on a memory. For example, the processor can perform various operations that can be specified by such computer and/or machine readable, writable, and/or executable components and/or instructions including, but not limited to, logic, control, input/output (I/O), arithmetic, and/or the like. In some embodiments, processors herein can comprise one or more central processing unit, multi-core processor, microprocessor, dual microprocessors, microcontroller, System on a Chip (SOC), array processor, vector processor, quantum processor, and/or another type of processor.

Figure 5:
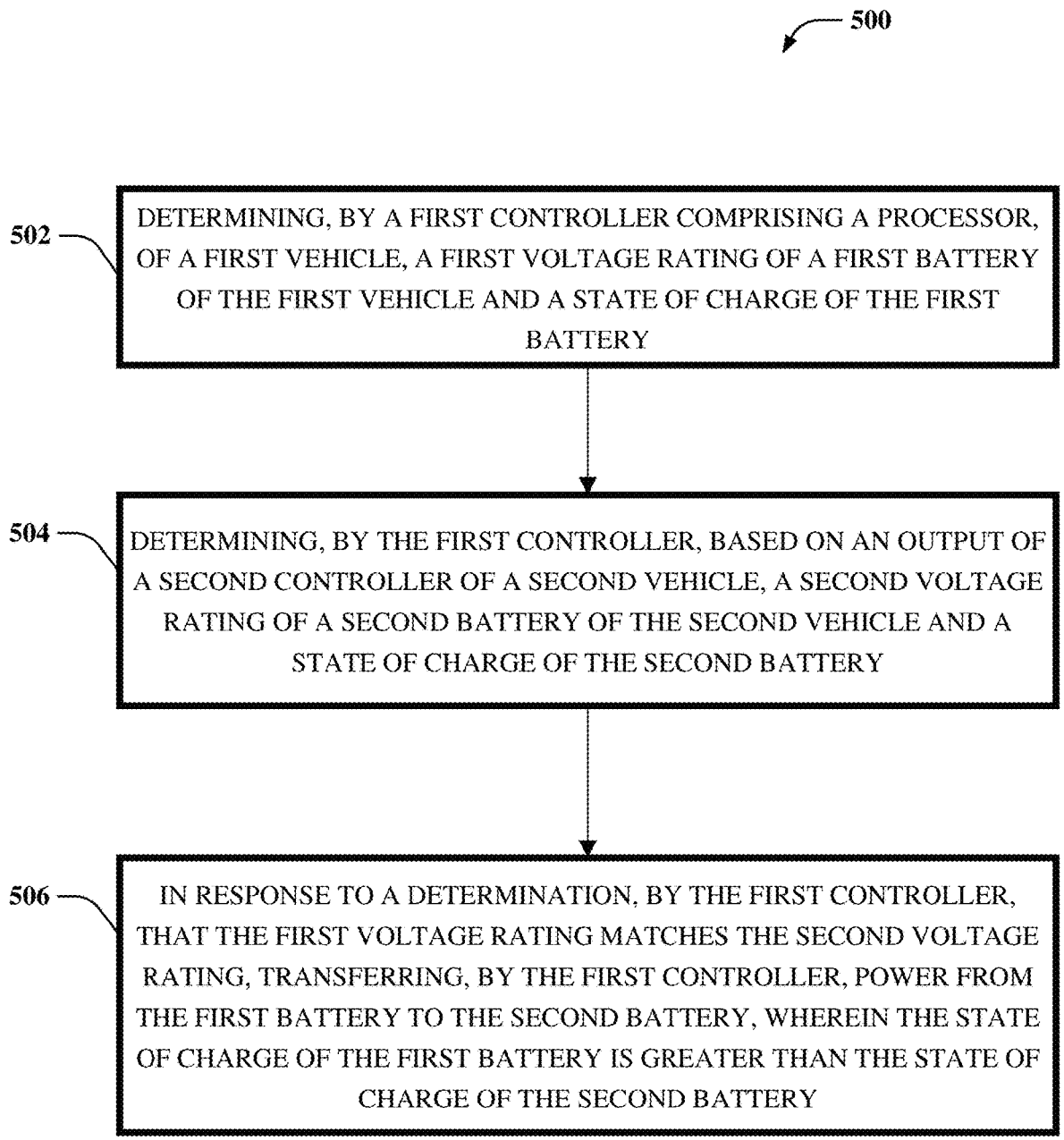
FIG. 5 illustrates a flow diagram of an example, non-limiting process for vehicle-to-vehicle power transfer in accordance with one or more embodiments described herein.

FIG. 5 illustrates a flow diagram of an example, non-limiting process 500 in accordance with one or more embodiments described herein. Repetitive description of like elements and/or processes employed in respective embodiments is omitted for sake of brevity. At 502, the process 500 can comprise determining, by a first controller (e.g., controller 236) comprising a processor, of a first vehicle (e.g., vehicle 104), a first voltage rating of a first battery (e.g., battery 210) of the first vehicle and a state of charge of the first battery (e.g., battery 210). At 504, the process 500 can comprise determining, by the first controller (e.g., controller 236), based on an output of a second controller (e.g., controller 236b) of a second vehicle (e.g., vehicle 404), a second voltage rating of a second battery (e.g., battery 210b) of the second vehicle and a state of charge of the second battery (e.g., battery 210b). At 506, the process 500 can comprise in response to a determination, by the first controller (e.g., controller 236), that the first voltage rating matches the second voltage rating, transferring, by the first controller (e.g., controller 236), power from the first battery (e.g., battery 210) to the second battery (e.g., battery 210b), wherein the state of charge of the first battery (e.g., battery 210) is greater than the state of charge of the second battery (e.g., battery 210b).

Systems described herein can be coupled (e.g., communicatively, electrically, operatively, optically, etc.) to one or more local or remote (e.g., external) systems, sources, and/or devices (e.g., electronic control systems (ECU), classical and/or quantum computing devices, communication devices, etc.). For example, systems herein (or other systems, controllers, processors, etc.) can be coupled (e.g., communicatively, electrically, operatively, optically, etc.) to one or more local or remote (e.g., external) systems, sources, and/or devices using a data cable (e.g., High-Definition Multimedia Interface (HDMI), recommended standard (RS), Ethernet cable, etc.) and/or one or more wired networks described below.

In some embodiments, systems herein can be coupled (e.g., communicatively, electrically, operatively, optically, etc.) to one or more local or remote (e.g., external) systems, sources, and/or devices (e.g., electronic control units (ECU), classical and/or quantum computing devices, communication devices, etc.) via a network. In these embodiments, such a network can comprise one or more wired and/or wireless networks, including, but not limited to, a cellular network, a wide area network (WAN) (e.g., the Internet), and/or a local area network (LAN). For example, a system herein can communicate with one or more local or remote (e.g., external) systems, sources, and/or devices, for instance, computing devices using such a network, which can comprise virtually any desired wired or wireless technology, including but not limited to: powerline ethernet, wireless fidelity (Wi-Fi), BLUETOOTH®, fiber optic communications, global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In this example, systems herein can thus include hardware (e.g., a central processing unit (CPU), a transceiver, a decoder, an antenna (e.g., a ultra-wideband (UWB) antenna, a BLUETOOTH® low energy (BLE) antenna, etc.), quantum hardware, a quantum processor, etc.), software (e.g., a set of threads, a set of processes, software in execution, quantum pulse schedule, quantum circuit, quantum gates, etc.), or a combination of hardware and software that facilitates communicating information between a system herein and remote (e.g., external) systems, sources, and/or devices (e.g., computing and/or communication devices such as, for instance, a smart phone, a smart watch, wireless earbuds, etc.).

Systems herein can comprise one or more computer and/or machine readable, writable, and/or executable components and/or instructions that, when executed by processor (e.g., a classical processor, a quantum processor, etc.), can facilitate performance of operations defined by such component(s) and/or instruction(s). Further, in numerous embodiments, any component associated with a system herein, as described herein with or without reference to the various figures of the subject disclosure, can comprise one or more computer and/or machine readable, writable, and/or executable components and/or instructions that, when executed by a processor, can facilitate performance of operations defined by such component(s) and/or instruction(s). For example, any component associated with systems as disclosed herein (e.g., communicatively, electronically, operatively, and/or optically coupled with and/or employed by a system described herein), can comprise such computer and/or machine readable, writable, and/or executable component(s) and/or instruction(s). Consequently, according to numerous embodiments or systems herein and/or any components associated therewith as disclosed herein, can employ a processor to execute such computer and/or machine readable, writable, and/or executable component(s) and/or instruction(s) to facilitate performance of one or more operations described herein with reference to system herein and/or any such components associated therewith.

Systems herein can comprise any type of system, device, machine, apparatus, component, and/or instrument that comprises a processor and/or that can communicate with one or more local or remote electronic systems and/or one or more local or remote devices via a wired and/or wireless network. All such embodiments are envisioned. For example, a system herein can comprise a computing device, a general-purpose computer, a special-purpose computer, an onboard computing device, a communication device, an onboard communication device, a server device, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Figure 6:
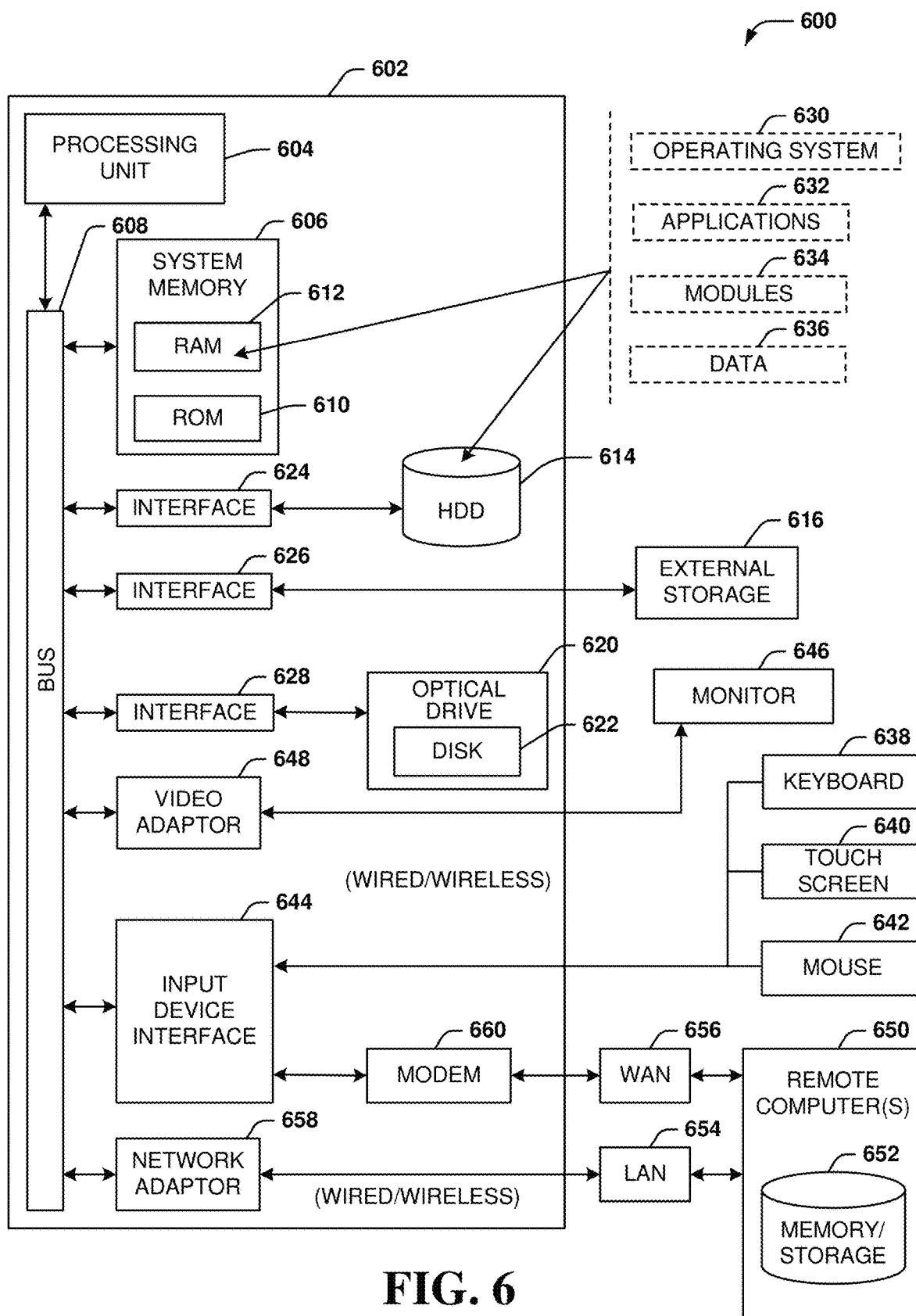
FIG. 6 is an example, non-limiting computing environment in which one or more embodiments described herein can be implemented.

In order to provide additional context for various embodiments described herein, FIG. 6 and the following discussion are intended to provide a brief, general description of a suitable computing environment 600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 6, the example environment 600 for implementing various embodiments of the aspects described herein includes a computer 602, the computer 602 including a processing unit 604, a system memory 606 and a system bus 608. The system bus 608 couples system components including, but not limited to, the system memory 606 to the processing unit 604. The processing unit 604 can be any of various commercially available processors. Dual microprocessors and other multi-processor architectures can also be employed as the processing unit 604.

The system bus 608 can be any of several types of bus structure that can further interconnect to a memory bus (with or without a memory controller), a peripheral bus, and a local bus using any of a variety of commercially available bus architectures. The system memory 606 includes ROM 610 and RAM 612. A basic input/output system (BIOS) can be stored in a non-volatile memory such as ROM, erasable programmable read only memory (EPROM), EEPROM, which BIOS contains the basic routines that help to transfer information between elements within the computer 602, such as during startup. The RAM 612 can also include a high-speed RAM such as static RAM for caching data.

The computer 602 further includes an internal hard disk drive (HDD) 614 (e.g., EIDE, SATA), one or more external storage devices 616 (e.g., a magnetic floppy disk drive (FDD) 616, a memory stick or flash drive reader, a memory card reader, etc.) and an optical disk drive 620 (e.g., which can read or write from a CD-ROM disc, a DVD, a BD, etc.). While the internal HDD 614 is illustrated as located within the computer 602, the internal HDD 614 can also be configured for external use in a suitable chassis (not shown). Additionally, while not shown in environment 600, a solid-state drive (SSD) could be used in addition to, or in place of, an HDD 614. The HDD 614, external storage device(s) 616 and optical disk drive 620 can be connected to the system bus 608 by an HDD interface 624, an external storage interface 626 and an optical drive interface 628, respectively. The interface 624 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 612, including an operating system 630, one or more application programs 632, other program modules 634 and program data 636. All or portions of the operating system, applications, modules, and/or data can also be cached in the RAM 612. The systems and methods described herein can be implemented utilizing various commercially available operating systems or combinations of operating systems.

Computer 602 can optionally comprise emulation technologies. For example, a hypervisor (not shown) or other intermediary can emulate a hardware environment for operating system 630, and the emulated hardware can optionally be different from the hardware illustrated in FIG. 6. In such an embodiment, operating system 630 can comprise one virtual machine (VM) of multiple VMs hosted at computer 602. Furthermore, operating system 630 can provide runtime environments, such as the Java runtime environment or the .NET framework, for applications 632. Runtime environments are consistent execution environments that allow applications 632 to run on any operating system that includes the runtime environment. Similarly, operating system 630 can support containers, and applications 632 can be in the form of containers, which are lightweight, standalone, executable packages of software that include, e.g., code, runtime, system tools, system libraries and settings for an application.

Further, computer 602 can be enable with a security module, such as a trusted processing module (TPM). For instance, with a TPM, boot components hash next in time boot components, and wait for a match of results to secured values, before loading a next boot component. This process can take place at any layer in the code execution stack of computer 602, e.g., applied at the application execution level or at the operating system (OS) kernel level, thereby enabling security at any level of code execution.

A user can enter commands and information into the computer 602 through one or more wired/wireless input devices, e.g., a keyboard 638, a touch screen 640, and a pointing device, such as a mouse 642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 604 through an input device interface 644 that can be coupled to the system bus 608, but can be connected by other interfaces, such as a parallel port, an IEEE 1394 serial port, a game port, a USB port, an IR interface, a BLUETOOTH® interface, etc.

A monitor 646 or other type of display device can be also connected to the system bus 608 via an interface, such as a video adapter 648. In addition to the monitor 646, a computer typically includes other peripheral output devices (not shown), such as speakers, printers, etc.

The computer 602 can operate in a networked environment using logical connections via wired and/or wireless communications to one or more remote computers, such as a remote computer(s) 650. The remote computer(s) 650 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 652 is illustrated. The logical connections depicted include wired/wireless connectivity to a local area network (LAN) 654 and/or larger networks, e.g., a wide area network (WAN) 656. Such LAN and WAN networking environments are commonplace in offices and companies, and facilitate enterprise-wide computer networks, such as intranets, all of which can connect to a global communications network, e.g., the Internet.

When used in a LAN networking environment, the computer 602 can be connected to the local network 654 through a wired and/or wireless communication network interface or adapter 658. The adapter 658 can facilitate wired or wireless communication to the LAN 654, which can also include a wireless access point (AP) disposed thereon for communicating with the adapter 658 in a wireless mode.

When used in a WAN networking environment, the computer 602 can include a modem 660 or can be connected to a communications server on the WAN 656 via other means for establishing communications over the WAN 656, such as by way of the Internet. The modem 660, which can be internal or external and a wired or wireless device, can be connected to the system bus 608 via the input device interface 644. In a networked environment, program modules depicted relative to the computer 602 or portions thereof, can be stored in the remote memory/storage device 652. It will be appreciated that the network connections shown are example and other means of establishing a communications link between the computers can be used.

When used in either a LAN or WAN networking environment, the computer 602 can access cloud storage systems or other network-based storage systems in addition to, or in place of, external storage devices 616 as described above. Generally, a connection between the computer 602 and a cloud storage system can be established over a LAN 654 or WAN 656 e.g., by the adapter 658 or modem 660, respectively. Upon connecting the computer 602 to an associated cloud storage system, the external storage interface 626 can, with the aid of the adapter 658 and/or modem 660, manage storage provided by the cloud storage system as it would other types of external storage. For instance, the external storage interface 626 can be configured to provide access to cloud storage sources as if those sources were physically connected to the computer 602.

The computer 602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 7:
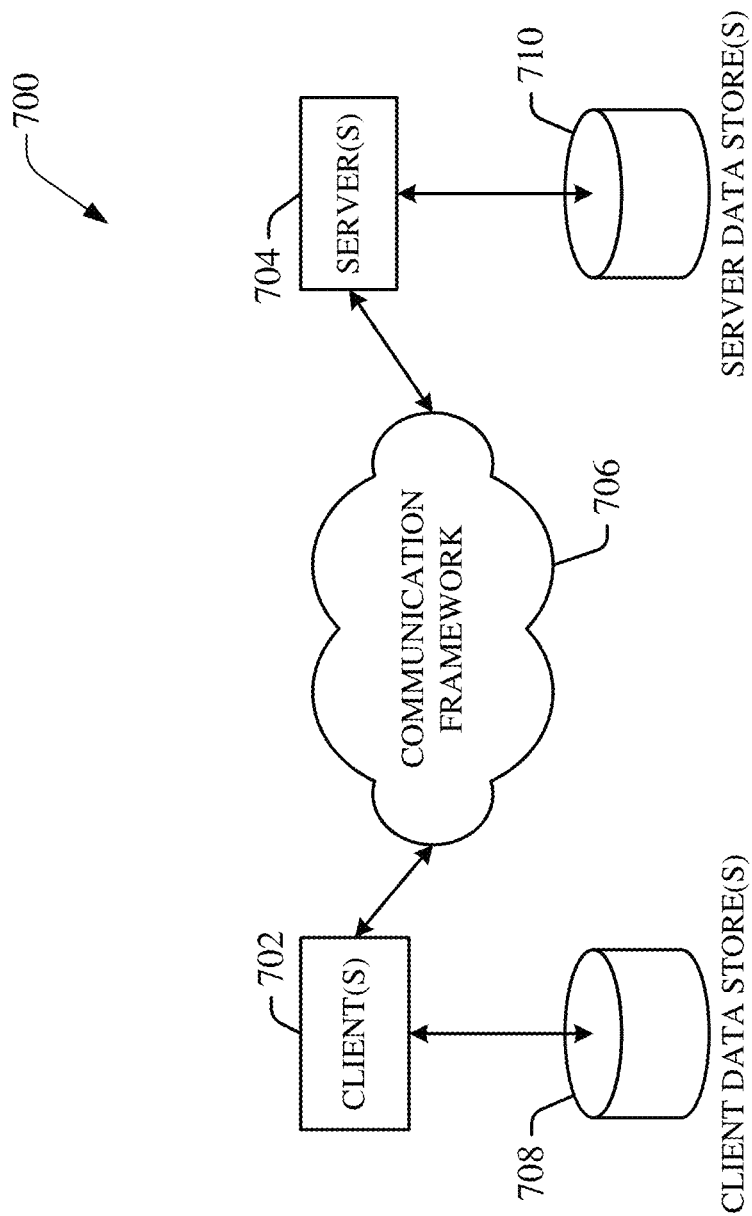
FIG. 7 is an example, non-limiting networking environment in which one or more embodiments described herein can be implemented.

Referring now to FIG. 7, there is illustrated a schematic block diagram of a computing environment 700 in accordance with this specification. The system 700 includes one or more client(s) 702, (e.g., computers, smart phones, tablets, cameras, PDA's). The client(s) 702 can be hardware and/or software (e.g., threads, processes, computing devices). The client(s) 702 can house cookie(s) and/or associated contextual information by employing the specification, for example.

The system 700 also includes one or more server(s) 704. The server(s) 704 can also be hardware or hardware in combination with software (e.g., threads, processes, computing devices). The servers 704 can house threads to perform transformations of media items by employing aspects of this disclosure, for example. One possible communication between a client 702 and a server 704 can be in the form of a data packet adapted to be transmitted between two or more computer processes wherein data packets can include coded analyzed headspaces and/or input. The data packet can include a cookie and/or associated contextual information, for example. The system 700 includes a communication framework 706 (e.g., a global communication network such as the Internet) that can be employed to facilitate communications between the client(s) 702 and the server(s) 704.

Communications can be facilitated via a wired (including optical fiber) and/or wireless technology. The client(s) 702 are operatively connected to one or more client data store(s) 708 that can be employed to store information local to the client(s) 702 (e.g., cookie(s) and/or associated contextual information). Similarly, the server(s) 704 are operatively connected to one or more server data store(s) 710 that can be employed to store information local to the servers 704.

In one exemplary implementation, a client 702 can transfer an encoded file, (e.g., encoded media item), to server 704. Server 704 can store the file, decode the file, or transmit the file to another client 702. It is to be appreciated, that a client 702 can also transfer uncompressed file to a server 704 and server 704 can compress the file and/or transform the file in accordance with this disclosure. Likewise, server 704 can encode information and transmit the information via communication framework 706 to one or more clients 702.

The illustrated aspects of the disclosure can also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature can be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further aspects of the invention are provided by the subject matter of the following clauses:

1. A system, comprising:
    a first vehicle comprising a first battery, a first controller, an inverter, and an electric motor; and
    a second vehicle comprising a second battery and a second controller, wherein the electric motor and the inverter convert an output voltage of the first battery to a voltage rating of the second battery, and wherein the first vehicle charges the second battery at the output voltage.

2. The system of any preceding clause, wherein a nominal voltage of the first battery is higher than a nominal voltage of the second battery.

3. The system of any preceding clause, wherein the first controller controls the electric motor and the inverter to convert the output voltage of the first battery to the voltage rating of the second battery based on data transmitted between the first controller and the second controller, indicative of a voltage rating of the first battery, the voltage rating of the second battery, a state of charge of the first battery, and a state of charge of the second battery.

4. The system of any preceding clause, wherein the inverter operates in a buck mode comprising step down direct current to direct current conversion of a voltage of the first battery to the output voltage of the first battery.

5. The system of any preceding clause, wherein a voltage rating of the first battery is higher than the voltage rating of the second battery.

6. The system of any preceding clause, wherein the first battery comprises a first state of charge greater than a second state of charge of the second battery.

7. The system of any preceding clause, wherein the inverter comprises at least six semi-conductor switches.

8. The system of clause 1 above with any set of combinations of systems 2-7 above.

9. A vehicle-to-vehicle power transfer system, comprising:
    a first vehicle comprising a first battery, a first controller, an inverter, and an electric motor; and
    a second vehicle comprising a second battery and a second controller, wherein the electric motor and the inverter convert an output voltage of the second battery to a voltage rating of the first battery, and wherein the second vehicle charges the first battery at the output voltage.

10. The vehicle-to-vehicle power transfer system of any preceding clause, wherein a nominal voltage of the first battery is higher than a nominal voltage of the second battery.

11. The vehicle-to-vehicle power transfer system of any preceding clause, wherein the first controller controls the electric motor and the inverter to convert the output voltage of the second battery to the voltage rating of the first battery based on a data transmitted between the first controller and the second controller, indicative of the voltage rating of the first battery, a voltage rating of the second battery, a state of charge of the first battery, and a state of charge of the second battery.

12. The vehicle-to-vehicle power transfer system of any preceding clause, wherein the inverter operates in a boost mode comprising step up direct current to direct current conversion of a voltage of the second battery to a voltage rating of the first battery.

13. The vehicle-to-vehicle power transfer system of any preceding clause, wherein a voltage rating of the first battery is higher than the voltage rating of the second battery.

14. The vehicle-to-vehicle power transfer system of any preceding clause, wherein the first battery comprises a first state of charge lesser than a second state of charge of the second battery.

15. The vehicle-to-vehicle power transfer system of any preceding clause, wherein the inverter comprises at least six semi-conductor switches.

16. The vehicle-to-vehicle power transfer system of clause 9 above with any set of combinations of vehicle-to-vehicle power transfer systems 10-15 above.

17. A method, comprising:
  determining, by a first controller comprising a processor, of a first vehicle, a first voltage rating of a first battery of the first vehicle and a state of charge of the first battery;
  determining, by the first controller, based on an output of a second controller of a second vehicle, a second voltage rating of a second battery of the second vehicle and a state of charge of the second battery; and
  in response to a determination, by the first controller, that the first voltage rating matches the second voltage rating, transferring, by the first controller, power from the first battery to the second battery, wherein the state of charge of the first battery is greater than the state of charge of the second battery.

18. The method of any preceding clause, wherein the first voltage rating and the second voltage rating comprise 800 volts.

19. The method of any preceding clause, wherein the first voltage rating and the second voltage rating comprise 400 volts.

20. The method of any preceding clause, wherein an inverter of the first vehicle operates in a buck mode comprising step down direct current to direct current conversion of a voltage of the first battery to a voltage of the second battery.

21. The method of any preceding clause, wherein an inverter of the second vehicle operates in a boost mode comprising step up direct current to direct current conversion of a voltage of the first battery to a voltage of the second battery.

22. The method of any preceding clause, wherein the first battery comprises a first nominal voltage lower than a second nominal voltage of the second battery.

23. The method of clause 17 above with any set of combinations of methods 18-22 above.

What is claimed is:

1. A first vehicle, comprising:
  a first battery;
  a first controller;
  an electric motor; and
  an inverter comprising three legs, wherein each leg comprises a first switch with built in diode coupled to a second switch with built in diode, wherein each leg is coupled to a different phase of the electric motor, and wherein the inverter is coupled to the first battery,
  wherein the first vehicle is physically coupled, via a charging cable to a second vehicle comprising a second battery and a second controller, and
  wherein the first controller controls the electric motor and the inverter, via settings of the respective first switches and respective second switches of the three legs, to convert an output voltage of the first battery to a voltage rating of the second battery, and wherein the first vehicle charges the second battery at the output voltage.

2. The first vehicle of claim 1, wherein a nominal voltage of the first battery is higher than a nominal voltage of the second battery.

3. The first vehicle of claim 1, wherein the first controller controls the electric motor and the inverter to convert the output voltage of the first battery to the voltage rating of the second battery based on data transmitted between the first controller and the second controller, wherein the data is indicative of a voltage rating of the first battery, the voltage rating of the second battery, a state of charge of the first battery, and a state of charge of the second battery.

4. The first vehicle of claim 1, wherein the inverter operates in a buck mode comprising step down direct current to direct current conversion of the output voltage of the first battery to the voltage rating of the second battery.

5. The first vehicle of claim 1, wherein a voltage rating of the first battery is higher than the voltage rating of the second battery, and wherein the inverter operates in a buck mode comprising step down conversion of the output voltage of the first battery to the voltage rating of the second battery.

6. The first vehicle of claim 1, wherein the first battery comprises a first state of charge greater than a second state of charge of the second battery.

7. The first vehicle of claim 1, wherein a voltage rating of the first battery is lower than the voltage rating of the second battery, and wherein the inverter operates in a boost mode comprising step up conversion of the output voltage of the first battery to the voltage rating of the second battery.

8. A first vehicle, comprising:
  a first battery;
  a first controller;
  an electric motor; and
  an inverter comprising three legs, wherein each leg comprises a first switch with built in diode coupled to a second switch with built in diode, wherein each leg is coupled to a different phase of the electric motor, and wherein the inverter is coupled to the first battery,
  wherein the first vehicle is physically coupled, via a charging cable to a second vehicle comprising a second battery and a second controller, and
  wherein the first controller controls the electric motor and the inverter, via settings of the respective first switches and respective second switches of the three legs, to convert an output voltage of the second battery received through the charging cable to a voltage rating of the first battery, and wherein the first battery is charged at the voltage rating by the converted output voltage.

9. The first vehicle of claim 8, wherein a nominal voltage of the first battery is higher than a nominal voltage of the second battery.

10. The first vehicle of claim 8, wherein the first controller controls the electric motor and the inverter to convert the output voltage of the second battery to the voltage rating of the first battery based on data transmitted between the first controller and the second controller, wherein the data is indicative of the voltage rating of the first battery, a voltage rating of the second battery, a state of charge of the first battery, and a state of charge of the second battery.

11. The first vehicle of claim 8, wherein the inverter operates in a boost mode comprising step up direct current to direct current conversion of the output voltage of the second battery to the voltage rating of the first battery.

12. The first vehicle of claim 8, wherein the voltage rating of the first battery is higher than a voltage rating of the second battery, and wherein the inverter operates in a boost mode comprising step up conversion of the output voltage of the second battery to the voltage rating of the first battery.

13. The first vehicle of claim 8, wherein the first battery comprises a first state of charge lesser than a second state of charge of the second battery.

14. The first vehicle of claim 8, wherein the voltage rating of the first battery is lower than a voltage rating of the second battery, and wherein the inverter a buck mode comprising step down conversion of the output voltage of the second battery to the voltage rating of the first battery.

15. A method, comprising:
- determining, by a first controller comprising a processor, of a first vehicle, a first voltage rating of a first battery of the first vehicle and a first state of charge of the first battery;
- determining, by the first controller, based on an output of a second controller of a second vehicle, a second voltage rating of a second battery of the second vehicle and a second state of charge of the second battery; and
- in response to a determination that the first state of charge of the first battery is greater than the second state of charge of the second battery transferring, by the first controller, power from the first battery to the second battery, wherein the transferring comprises:
  - controlling, by the first controller, an inverter of the first vehicle to convert an output voltage of the first battery to the second voltage rating of the second battery of the second vehicle, wherein the inverter comprises three legs, wherein each leg comprises a first switch with built in diode coupled to a second switch with built in diode, wherein each leg is coupled to a different phase of an electric motor of the first vehicle, and wherein the inverter is coupled to the first battery.

16. The method of claim 15, wherein at least one of the first voltage rating or the second voltage rating comprise 800 volts.

17. The method of claim 15, wherein at least one of the first voltage rating or the second voltage rating comprise 400 volts.

18. The method of claim 15, wherein the first voltage rating of the first battery is higher than the second voltage rating of the second battery, and wherein the inverter of the first vehicle operates in a buck mode comprising step down conversion of the output voltage of the first battery to the second voltage rating of the second battery.

19. The method of claim 15, wherein the first voltage rating of the first battery is lower than the second voltage rating of the second battery, and wherein the inverter of the first vehicle operates in a boost mode comprising step up conversion of the output voltage of the first battery to the second voltage rating of the second battery.

20. The method of claim 15, wherein the inverter comprises at least one capacitor.

* * * * *